W. PARKES.
HAND CRANK FOR CAMERAS.
APPLICATION FILED APR. 20, 1916.
1,278,992.
Patented Sept. 17, 1918.
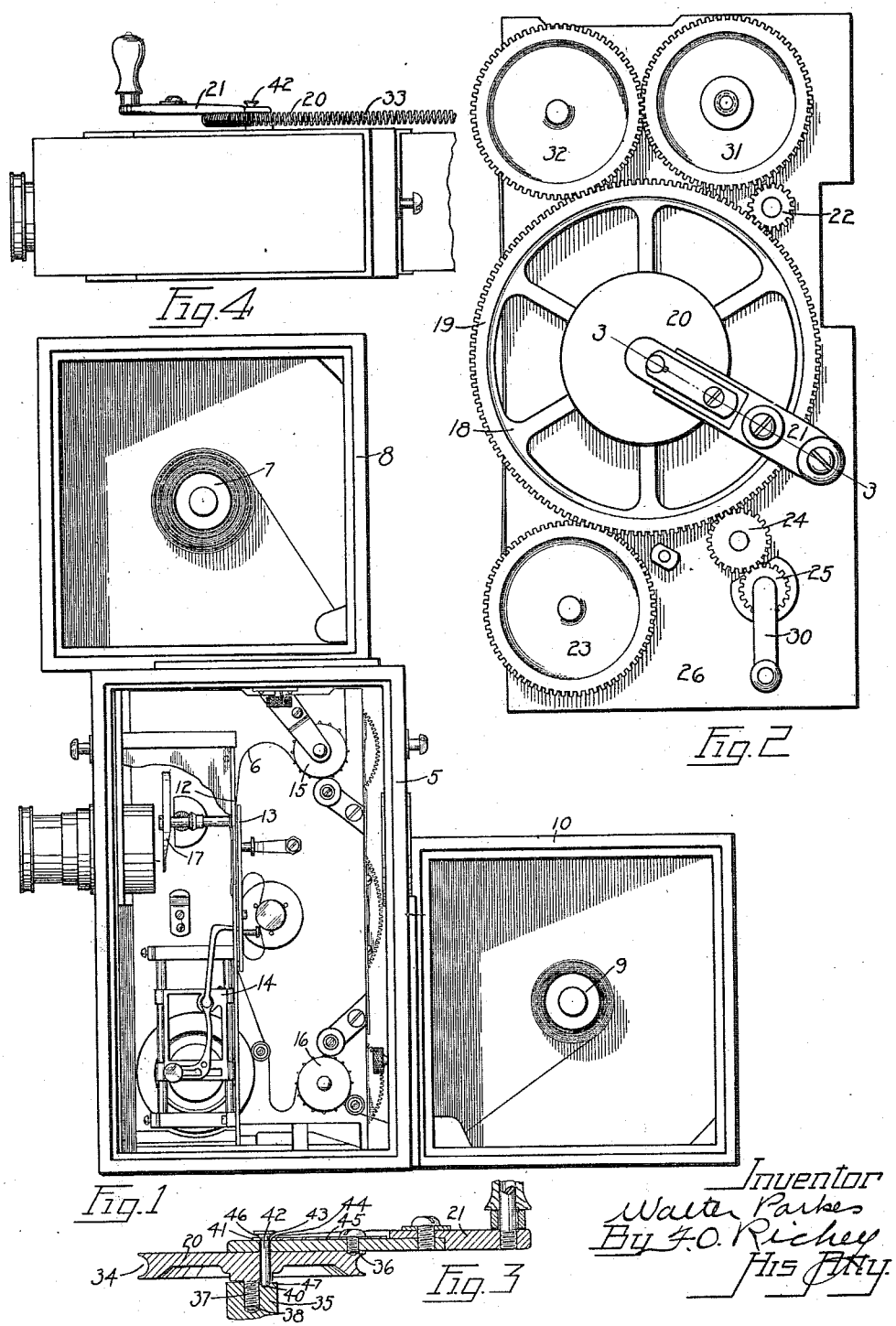
Inventor
Walter Parkes
By F.O. Richey
His Atty.

UNITED STATES PATENT OFFICE.

WALTER PARKES, OF ELYRIA, OHIO, ASSIGNOR TO ARTHUR L. GARFORD, OF ELYRIA, OHIO.

HAND-CRANK FOR CAMERAS.

1,278,992.     Specification of Letters Patent.     Patented Sept. 17, 1918.

Application filed April 20, 1916. Serial No. 92,568.

*To all whom it may concern:*

Be it known that I, WALTER PARKES, a subject of the King of Great Britain, residing at Elyria, in the county of Lorain and State of Ohio, have invented certain new and useful Improvements in Hand-Cranks for Cameras; and I do hereby declare the following to be a full, clear, and exact description of the invention, such as will enable others skilled in the art to which it appertains to make and use the same.

My invention relates to cameras and more particularly to cameras employed for taking motion pictures. The objects of my invention are to improve the mechanism for manually operating the camera when motion pictures are being taken.

One of the objects of my invention is to provide a pulley on the outside of the camera over which a driving chain or belt runs to transmit power to one of the driven members of the camera. The belt is likewise mounted on the outside of the camera, making it easy to remove it.

Another object of my invention is the provision of a suitable catch for maintaining the crank rigidly in position to prevent any lost motion in the operation of the camera, it being well known that lost motion often causes injury to the film.

Other objects of my invention and the invention itself will probably be better understood from a description of an embodiment of the invention.

In Figure 1 is shown a camera with one side removed and the parts shown therein illustrated in elevation.

Fig. 2 is an elevation of the driving mechanism.

Fig. 3 is a section through the line 3—3 of Fig. 2.

Fig. 4 is a top plan view of the camera.

Referring now to the drawing and to the embodiment of the invention illustrated therein at 5 is shown the walls of the camera which likewise may be used for printing the films. The camera is not only adapted to be used for the purpose of taking motion pictures, but may be used for taking still pictures. The film is illustrated at 6, which is normally wound upon a reel 7 in a casing 8 upon the top of the camera proper and after the picture is taken is wound upon a reel 9 mounted in a casing 10. The film passes between a frame part 12 and a door 13, being fed therethrough by mechanism illustrated at 14 and by sprockets illustrated at 15 and 16. The shutter is shown at 17. The driving mechanism is shown generally at 18, including a plurality of gear wheels 19, 32, 31, 22, 23, 24 and 25. These wheels are mounted upon a plate 26, which is normally inclosed within the camera.

It is often desired to operate the mechanism at different speeds. For this purpose, I show a plurality of driving mechanisms, here illustrated as cranks, one crank being shown at 30 and the other at 21. A pulley 20 is mounted concentrically with the gear wheel 18 and on the outside of the camera, as shown in Fig. 4. A belt 33 passes through a groove 34 in the pulley 20, and is employed to drive some part of the mechanism, for example, the reel 9. This pulley is mounted on the outside of the camera in order to enable the operator to readily remove the belt, so as to adapt the camera to be used to take still pictures. The shaft carrying the pulley 20 is shown at 35. The pulley 20 and the crank 21 are rigidly connected together by any suitable means, such as a screw 36. A threaded spur 37 is mounted upon the pulley 20 and threads into a threaded bore 38 in the member 35.

When it is desired to mount the members 20 and 21 upon the part 35, the pulley and crank are rotated, threading the stud 37 into the bore 38 until the stud is screwed way down in the bore 38. If no other connecting means were used, such a joint would, especially after the parts wore, cause some lost motion in the operation of the device. I provide means for preventing this, and such means are made so that the parts 20 and 21 may be quickly removed from the part 35. The top of the part 35 is provided with one or more recesses 40 and a hole 41 is bored through the parts 20 and 21. A pin 42 projects through this hole, such pin being provided with a head 43, which can be grasped between the forefinger and thumb. A shoulder 44 is formed upon the pin and a spring 45 is connected to the crank 21. The spring 45 is provided with an opening 46 through which the pin projects. The spring normally tends to hold the pin in the position shown in the drawing. Now, when the stud 37 is screwed to its way-down position in the bore 38, the end 47 of the pin drops into one of the openings 40, and it will be impossible to move the pulley or the crank without moving the member 35, so that there can be no lost motion. When it is desired to move the pulley and crank, the head of the pin is grasped between the forefinger and thumb and the pin is lifted from the recess 40 and the crank and pulley quickly unscrewed from the part 35.

I have illustrated this embodiment of my invention and the details thereof for the purpose of describing my invention. I do not wish to be limited to such form or details illustrated, but contemplate numerous and extensive departures therefrom without departing from the spirit of my invention, all of which will be clear to those skilled in the art.

I claim:—

1. In a motion picture camera, the combination of a rotatable shaft, a pully and a crank arm, inter-engaging threaded parts upon said pulley and said shaft and catch means including recesses on said shaft and a spring pressed pin on said arm for interconnecting said arm and shaft and preventing one from moving with respect to the other.

2. In a device of the class described, a rotatable shaft provided with a threaded recess in one end thereof and concentric with the shaft and with a plurality of recesses in the end of the shaft about the threaded recess, a pulley having a threaded stud to coöperate with the threads in the threaded recess in the shaft, a crank arm on the pulley, and a spring pressed pin having an end adapted to enter one of the recesses in the end of the shaft to interconnect said parts and prevent relative movement thereof.

3. In a motion picture camera, the combination of a rotatable shaft provided with a threaded bore, a pulley and a crank arm attached thereto, a threaded stud on said pulley concentric therewith adapted to be screwed into said bore, and catch means for automatically maintaining said pulley and crank arm in position upon said shaft.

4. In a motion picture camera, the combination of a rotatable shaft, a pulley and a crank arm, interengaging threaded parts upon said pulley and said shaft and catch means including recesses on one of said parts and a spring pressed pin on another of said parts for interconnecting said parts and preventing one from moving with respect to the other.

In witness whereof I have signed my name hereunto this 3rd day of April, 1916.

WALTER PARKES.

Copies of this patent may be obtained for five cents each, by addressing the "Commissioner of Patents, Washington, D. C."